May 30, 1967    K. R. BOGH ET AL    3,322,292
PORTABLE HYDRAULIC LIFTING DEVICE
Filed Aug. 30, 1965    2 Sheets-Sheet 1

INVENTORS
Keith R. Bogh
BY Billy R. Bogh

Sam J. Slotoky
ATTORNEY

May 30, 1967  K. R. BOGH ET AL  3,322,292
PORTABLE HYDRAULIC LIFTING DEVICE
Filed Aug. 30, 1965  2 Sheets-Sheet 2

INVENTORS
Keith R. Bogh
BY Billy R. Bogh

Sam J. Slotsky
ATTORNEY 3,322,292
PORTABLE HYDRAULIC LIFTING DEVICE
Keith R. Bogh and Billy R. Bogh, Le Mars, Iowa 51031
Filed Aug. 30, 1965, Ser. No. 483,437
2 Claims. (Cl. 214—512)

Our invention relates to a portable lifting device.

An object of our invention is to provide a horizontal lifting and carrying device upon which any device or implement can be driven, and which then can be raised by hydraulic means so that the devices or implements can be transported over a highway etc. wherever desired.

A further object of our invention is to provide special hydraulically operated units at the rear and forward portions of the device.

A further object of our invention is to provide a special wheeled arrangement to be attached to the forward portion of the device for certain purposes.

Figure 1:
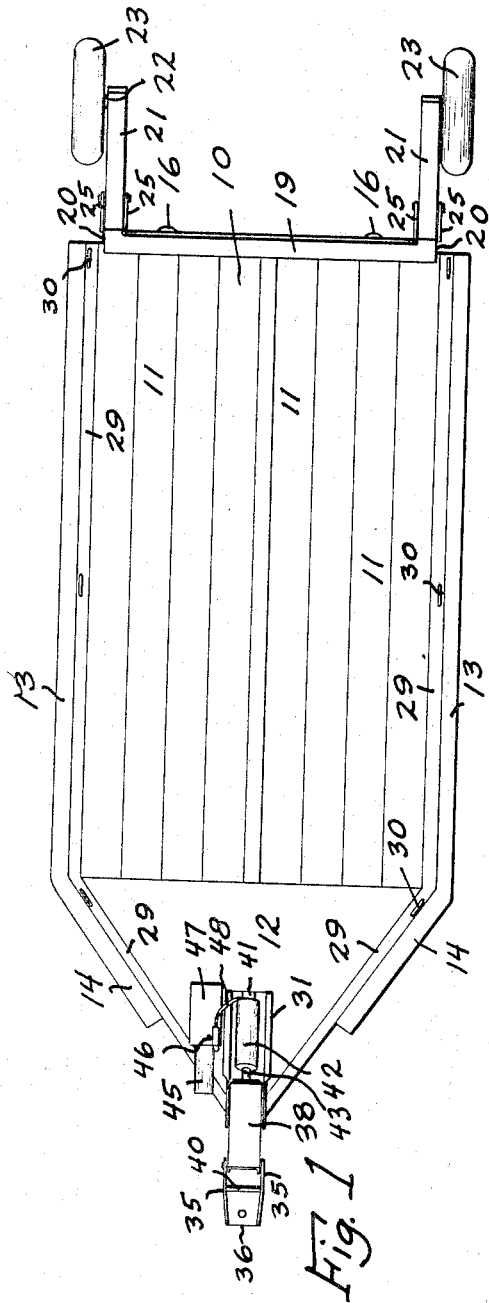
Figure 2:
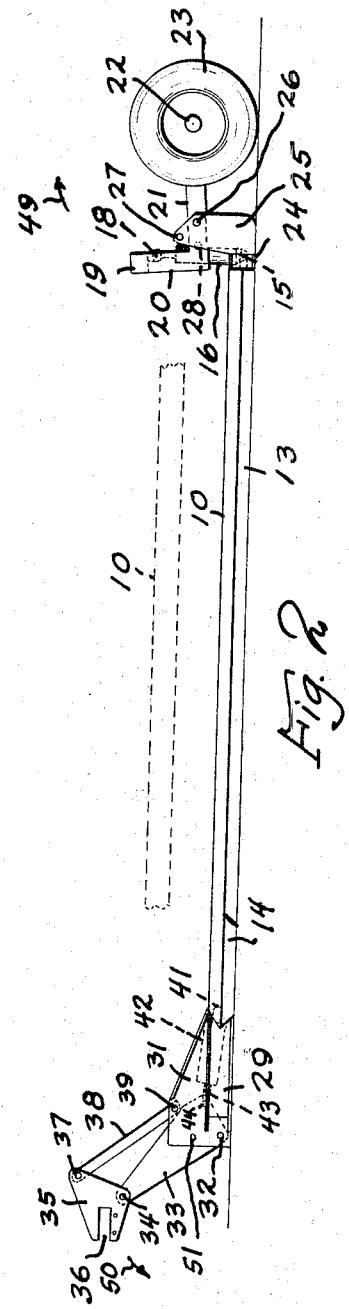
Figure 3:
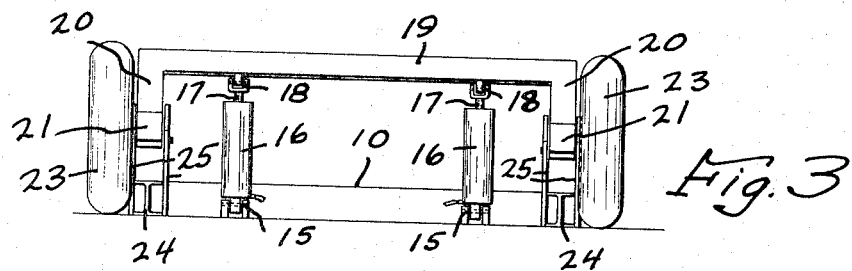
Figure 4:
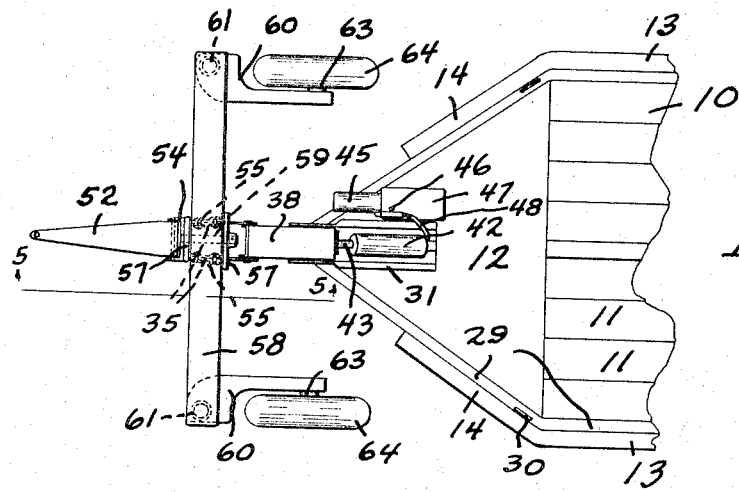
Figure 5:
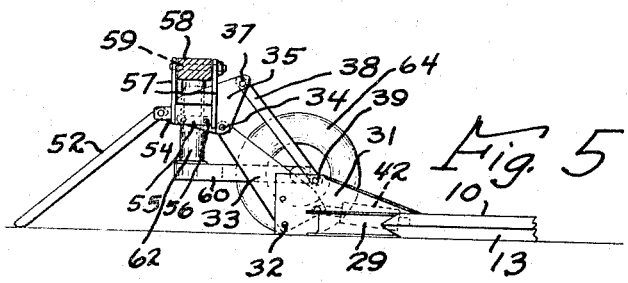

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

FIGURE 1 is a plan view of the device,
FIGURE 2 is a side elevation of FIGURE 1,
FIGURE 3 is a rear view of FIGURE 1,
FIGURE 4 is a plan view of the forward portion of the device with the special wheeled attachment, and
FIGURE 5 is a sectional view of FIGURE 4 taken substantially along the lines 5—5 thereof.

Our invention contemplates the provision of a special type of device which can be placed on the ground, and onto which a tractor, small dozer, harrow, rotary hoe etc. can be driven and whereupon the device or platform can be raised by hydraulic means, locked in position and thence used to transport the above mentioned devices.

The present application is an improvement on our co-pending application on a Portable Hydraulic Lifting Device, Serial No. 344,915 filed February 14, 1964, now Patent No. 3,232,464.

In describing our invention we have used the character 10 to designate a flat platform made up of a series of boards 11 suitably attached to suitable framework members, the character 12 indicating a triangular portion, and attached to the sides of the member 10 are the sloping walls 13 and 14 providing means whereupon a unit to be transported can be driven onto the platform 10, and pivoted at 15 to the rear of the platform 10 are a pair of hydraulic cylinders 16 having suitable pistons therein attached to piston rods 17 which are pivoted at 18 to the transverse bar 19 which extends into the vertical side members 20, the members 20 being secured to, or integral with, the further arms 21.

Journalled on the arms 21 at 22 are the wheels 23, the character 24 indicating further support members.

The character 25 indicates plates rigidly attached to the members 24 and pivoted to the plates 25 at 26 are the arms 21. The plates 25 include the openings 27 for the reception of suitable pins which will also pass into the further openings 28 to lock the platform in raised position as will be explained.

The character 29 indicates further frame-work portions in which are located the U-shaped members 30 which can be raised in order to tie the vehicles or transported members thereto, and which will include stop members at their lower portions to limit upper movement of the same. Attached to the framework portions 29 is a member 31 to which is pivoted at 32 a centrally positioned member 33 and pivoted to the member 33 at 34 are the plates 35 having the opening at 36 for attachment to a hitch, and pivoted at 37 to the plates 35 is the channel 38 which is pivoted at 39 to the members 31, the plates 35 being braced together by means of the member 40.

Pivotally attached at 41 to the platform 12 is a hydraulic cylinder 42, having a suitable piston therein attached to the piston rod 43 which is pivoted at 44 to the member 33.

The character 45 indicates a motor, the character 46 indicating a suitable lever, the character 47 indicating a tank of oil, the lever being adapted to control the flow of oil from the tank through the pipe 48 to the cylinder 42.

The hydraulic source of supply to the rear cylinders 16 can be taken off of the drawing vehicle or any other source, as can the forward portion, if desired.

The arrangement operates in the following manner. As above described, the vehicles to be transported can be driven up over the members 13 onto the platform 10 and tied down to the members 30, and the hydraulic pressure can then be applied to the cylinders 16 whereupon the members 19, 20, and 21 will swing in the direction of the arrow 49 (see FIGURE 2) whereupon the wheels 22 will bear downwardly against the ground and the platform 10 will be raised to the dotted position shown, and the pins can then be inserted in the openings 27 to lock the members.

Assuming that the hitch portion 36 is solidly attached to the drawing vehicle, the hydraulic pressure is then applied or simultaneously applied to the hydraulic cylinder 42, whereupon the member 33, channel 38 etc. will swing downwardly in the direction of the arrow 50 (see FIGURE 2), and since the drawing vehicle is rigid, the tendency will be to raise the platform 10 also, and in this manner the entire load is raised and can be transported. It will be also noted that the opening 36 will be always in horizontal position.

The character 51 indicates openings in the member 31 with suitable openings in the member 33 to thus lock the arrangement with pins at the forward end, in elevated position.

In those cases where it is desired to provide a separate wheel arrangement at the forward end of the unit, the modification shown in FIGURES 4 and 5 can be used, and in this form of device the character 52 will indicate a tongue pivoted at 54, the member 54 being attached by means of the side plates 55 as at 56 to the plates 35. The character 57 indicates vertical plates straddling the plates 35 and securely attached to the plates 55.

Received between the upper portions of the plates 57 is a transverse bar 58 which receives the longitudinal pin 59 which passes through the plates 57, and thereby permits the bar 58 to rock on the pin 59.

The character 60 indicates framework members, including the posts 61 attached thereto received within the tubular members 62 which are attached to the ends of the transverse bar 58, and journalled at 63 to the members 60 are the wheels 64.

This latter ararngement provides a wheeled support at the forward end of the platform unit and whereupon the wheels 64 can freely pivot at 61, and since the bar 58 is free to also pivot about the horizontally positioned pin 59, complete flexibility is assured over rough terrain and the like.

It will now be noted that we have provided the advantages mentioned in the objects of our invention with further advantages being apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. A portable hydraulic lifting device comprising a flat horizontally positioned platform, a hydraulic lifting unit mounted at the rear of said platform, said hydraulic lifting unit including a pair of support members attached to said platform, arms pivotally attached to said support members, said arms including portions positioned coplanar with said arms and substantially at right angles thereto, wheels journalled at the outer ends of said arms, a transverse bar attached to the ends of said portions, a pair of hydraulic cylinders pivotally attached to the rear of said platform and being positioned substantially adjacent to said arms, piston rods operated by said cylinders, said piston rods being pivotally attached to said transverse bar, whereby movement of said piston rods outwardly will raise said arms and lower said wheels to ground engaging position to thereby raise said platform, sloping side members attached to said platform over which devices to be transported can be driven onto said platform, a further hydraulic lifting unit mounted at the forward end of said platform said further hydraulic lifting unit including a rigid member attached to said platform, a lower substantially triangular member pivoted to said rigid member, a hydraulic piston unit pivotally attached to a corner portion of said triangular member, a channel member pivotally attached to said rigid member and parallel to said substantially triangular member, a hitching member pivotally attached at the ends of said substantially triangular member and said channel member, said hitching member having a horizontally positioned slot for receiving hitching portions of a drawing vehicle.

2. A portable hydraulic lifting device comprising a flat horizontally positioned platform, a hydraulic lifting unit mounted at the rear of said platform, said hydraulic lifting unit including a pair of support members attached to said platform, arms pivotally attached to said support members, said arms including portions positioned coplanar with said arms and substantially at right angles thereto, wheels journalled at the outer ends of said arms, a transverse bar attached to the ends of said portions, a pair of hydraulic cylinders pivotally attached to the rear of said platform and being positioned substantially adjacent to said arms, piston rods operated by said cylinders, said piston rods being pivotally attached to said transverse bar, whereby movement of said piston rods outwardly will raise said arms and lower said wheels to ground engaging position to thereby raise said platform, sloping side members attached to said platform over which devices to be transported can be driven onto said platform, a further hydraulic lifting unit mounted at the forward end of said platform, said further hydraulic lifting unit including a rigid member attached to said platform, a lower substantially triangular member pivoted to said rigid member, a hydraulic piston unit pivotally attached to a corner portion of said triangular member, a channel member pivotally attached to said rigid member and parallel to said substantially triangular member, a hitching member pivotally attached at the ends of said substantially triangular member and said channel member, said hitching member having a horizontally positioned slot for receiving hitching portions of a drawing vehicle, a carriage member attached to said hitching member, said carriage member including a transverse beam, means for pivotally mounting said beam centrally to said hitching member whereby said beam can rock in a transverse vertical plane, brackets pivotally mounted at the terminals of said beam, wheels journalled to said brackets.

References Cited

UNITED STATES PATENTS 3,232,464   2/1966   Bogh et al. _____ 214—512

GERALD M. FORLENZA, *Primary Examiner.*

ALBERT J. MAKAY, *Assistant Examiner.*